(12) United States Patent
Itoh et al.

(10) Patent No.: US 8,895,661 B2
(45) Date of Patent: Nov. 25, 2014

(54) PLASTIC LENS

(75) Inventors: Shinsuke Itoh, Shinjyuku-ku (JP);
Masahisa Kousaka, Shinjyuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 14/238,964

(22) PCT Filed: Aug. 15, 2012

(86) PCT No.: PCT/JP2012/070734
§ 371 (c)(1),
(2), (4) Date: Feb. 14, 2014

(87) PCT Pub. No.: WO2013/024863
PCT Pub. Date: Feb. 21, 2013

(65) Prior Publication Data
US 2014/0200323 A1    Jul. 17, 2014

(30) Foreign Application Priority Data
Aug. 15, 2011   (JP) .................. 2011-177657

(51) Int. Cl.
*G02B 1/04*   (2006.01)
*C08G 18/38*   (2006.01)
*C08G 18/28*   (2006.01)
*C08G 18/72*   (2006.01)

(52) U.S. Cl.
CPC ............ *G02B 1/041* (2013.01); *C08G 18/3876* (2013.01); *C08G 18/2825* (2013.01); *C08G 18/2815* (2013.01); *C08G 18/724* (2013.01)
USPC ........................................... 524/740; 528/67

(58) Field of Classification Search
CPC ....................................................... G02B 1/041
USPC ............................................. 524/240; 528/67
See application file for complete search history.

(56) References Cited

U.S. PATENT DOCUMENTS

| 5,194,559 A * | 3/1993 | Okazaki et al. ................. 528/49 |
| 2005/0046967 A1 | 3/2005 | Kosaka et al. |
| 2007/0141355 A1 | 6/2007 | Kosaka et al. |

FOREIGN PATENT DOCUMENTS

| JP | 05-078441 A | 3/1993 |
| JP | 2005-055716 A | 3/2005 |
| JP | 2007-090574 A | 4/2007 |

* cited by examiner

*Primary Examiner* — Kelechi Egwim
(74) *Attorney, Agent, or Firm* — Oblon, Spivak, McClelland, Maier & Neustadt, L.L.P.

(57) ABSTRACT

A plastic lens having excellent weather resistance, formed by polymerization of a composition containing a polyisocyanate compound having an aromatic ring and a polythiol compound is provided. The plastic lens is formed by polymerization of a composition that contains 100 parts by mass in total of (A) a polyisocyanate compound containing a polyisocyanate compound having an aromatic ring and (B) a polythiol compound, from 0.5 to 5.0 parts by mass of (C) a benzophenone compound having a hydroxyl group on at least the ortho position, and from 0.5 to 5.0 parts by mass of (D) a phenol compound.

8 Claims, No Drawings

PLASTIC LENS

CROSS REFERENCE TO RELATED APPLICATIONS

The present application is a 35 U.S.C. §371 national stage patent application of International patent application PCT/JP2012/070734, filed on Aug. 15, 2012, published as WO/2013/024863 on Feb. 21, 2013, the text of which is incorporated by reference, and claims the benefit of the filing date of Japanese application no. 2011-177657, filed on Aug. 15, 2011, the text of which is also incorporated by reference.

TECHNICAL FIELD

The present invention relates to a plastic lens. More specifically, the invention relates to a plastic lens having excellent weather resistance, formed by polymerization of a composition containing a polyisocyanate compound having an aromatic ring and a polythiol compound.

BACKGROUND ART

Known examples of a plastic lens having a high refractive index include a plastic lens formed of a resin obtained by polyaddition of a polyisocyanate compound and a polythiol compound. For example, the use of the plastic lens as a spectacle lens may provide an effect of decreasing the thickness of the lens due to the use of the resin having a high refractive index to improve the impression of the wearer. With respect to coloration of the resin, the resin is demanded to be low in the initial coloration and the aged deterioration and to have excellent weather resistance.

However, a plastic lens formed of a polyisocyanate compound having an aromatic ring is disadvantageously poor in weather resistance.

PTL 1 describes a plastic lens that contains a particular benzophenone derivative in a base material and is less in yellow coloration as compared to an ordinary product.

PTL 2 describes an optical urethane resin containing isocyanate compound having from 10 to 5,000 ppm of a phenol compound as a stabilizer added thereto and an active hydrogen compound, such as a polythiol compound, and a plastic lens using the same. However, PTLs 1 and 2 add a benzophenone derivative or a phenol compound for the initial optical characteristics of the plastic lens and for preventing the optical strain thereof, and fail to note enhancement of the weather resistance of the plastic lens.

CITATION LIST

Patent Literatures

PTL 1: JP-A-2005-55716
PTL 2: JP-A-05-78441

SUMMARY OF INVENTION

Technical Problem

An object of the present invention is to provide a plastic lens excellent in weather resistance as compared to an ordinary product, formed by polymerization of a polyisocyanate compound containing a polyisocyanate compound containing an aromatic ring, and a polythiol compound.

Solution to Problem

As a result of earnest investigations made by the present inventor, it has been found that the object may be achieved by using a composition that contains particular amounts of a benzophenone compound having a particular structure and a phenol compound with respect to the total amount of a polyisocyanate compound containing a polyisocyanate compound containing an aromatic ring, and a polythiol compound.

The present invention thus relates to a plastic lens formed by polymerization of a composition that contains 100 parts by mass in total of (A) a polyisocyanate compound containing a polyisocyanate compound having an aromatic ring and (B) a polythiol compound, from 0.5 to 5.0 parts by mass of (C) a benzophenone compound having a hydroxyl group on at least the ortho position, and from 0.5 to 5.0 parts by mass of (D) a phenol compound.

Advantageous Effects of Invention

According to the present invention, a plastic lens excellent in weather resistance may be provide even by using a polyisocyanate compound containing a polyisocyanate compound having an aromatic ring and a polythiol compound. The plastic lens of the present invention maybe favorably applied to a spectacle lens, a camera lens, a projector lens, a telescope lens, a magnifier lens, and the like.

DESCRIPTION OF EMBODIMENTS

The present invention relates to a plastic lens formed by polymerization of a composition that contains 100 parts by mass in total of (A) a polyisocyanate compound containing a polyisocyanate compound having an aromatic ring and (B) a polythiol compound, from 0.5 to 5.0 parts by mass of (C) a benzophenone compound having a hydroxyl group on at least the ortho position, and from 0.5 to 5.0 parts by mass of (D) a phenol compound.

The components contained in the composition will be described below.

(A) Polyisocyanate Compound containing Polyisocyanate Compound having Aromatic Ring The polyisocyanate compound used in the present invention is not particularly limited as far as it contains, as an essential component, a polyisocyanate compound having an aromatic ring.

Examples of the polyisocyanate compound having an aromatic ring include such polyisocyanate compounds as 1,4-phenylene diisocyanate, methyl-1,3-phenylene diisocyanate, 1,3-bis(isocyanatomethyl)benzene, 1,3-bis(2-isocyanatopropyl)benzene, 4,4'-methylenebisphenyl diisocyanate, 2,4'-methylenebisphenyl diisocyanate, 1,5-diisocyanatonaphthalene and (3,3'-dimethyl-4,4'-biphenylylene) diisocyanate.

A plastic lens having a high refractive index may be easily obtained by selecting a polyisocyanate compound having a relatively high refractive index among the aforementioned polyisocyanate compounds having an aromatic ring. In this point of view, the polyisocyanate compound having an aromatic ring used is preferably at least one selected from 4,4'-methylenebisphenyl diisocyanate, 2,4'-methylenebisphenyl diisocyanate and methyl-1,3-phenylene diisocyanate.

The polyisocyanate compound having an aromatic ring may be used solely or as a combination of two or more kinds thereof.

The content of the polyisocyanate compound having an aromatic ring in the component (A) used in the present invention is preferably from 50 to 100% by mass, more preferably from 60 to 90% by mass, and further preferably from 70 to 90% by mass, from the standpoint of the handleability of the composition and the effects of the present invention. In the present invention, a plastic lens having high weather resistance may be obtained even in the aforementioned case where the content of the polyisocyanate compound having an aromatic ring is large.

A polyisocyanate compound having no aromatic ring may be used in combination as the component (A) used in the present invention.

Examples of the polyisocyanate compound having no aromatic ring include an aliphatic polyisocyanate compound and a polyisocyanate compound having an alicyclic structure. Examples of the aliphatic polyisocyanate compound include 1,6-hexamethylene diisocyanate, lysine ester triisocyanate and 1,3,6-hexamethylene triisocyanate, and examples of the polyisocyanate compound having an alicyclic structure include isophorone diisocyanate, bis(isocyanatomethyl)cyclohexane, dicyclohexylmethane 4,4'-diisocyanate, 1,3-cyclohexane diisocyanate, 1,4-cyclohexane diisocyanate, 1,2-bis(isocyanatomethyl)cyclohexane, 1,3-bis(isocyanatomethyl)cyclohexane, 1,4-bis (isocyanatomethyl) cyclohexane, 1,3,5-tris (isocyanatomethyl) cyclohexane, bis (isocyanatomethyl)bicycloheptane and tris (isocyanatomethyl)bicycloheptane.

Among the above compounds, 1,6-hexamethylene diisocyanate is preferably used from the standpoint of the appearance of the resulting plastic lens. The good appearance of the plastic lens or the composition referred herein means high transparency and the absence of fog and coloration.

The polyisocyanate compound having no aromatic ring may be used solely or as a combination of two or more kinds thereof.

(B) Polythiol Compound

Examples of (B) the polythiol compound used in the present invention include an aliphatic polythiol compound and a polythiol compound having an alicyclic structure, such as 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, 1,1-bis (mercaptomethyl)cyclohexane, 2,3-dimercapto-1-propanol, ethylene glycol bis(2-mercaptoacetate), ethylene glycol bis(3-mercaptopropionate), diethylene glycol bis(2-mercaptoacetate), diethylene glycol bis (3-mercaptopropionate), 1,2-dimercaptopropyl methyl ether, 2,3-dimercaptopropyl methyl ether, 2,2-bis(mercaptomethyl)-1,3-propanedithiol, bis(2-mercaptoethyl) ether, bis(2-mercaptoethyl) sulfide, bis(2-mercaptoethyl) disulfide, trimethylolpropane bis(2-mercaptoacetate), trimethylolpropane bis(3-mercaptopropionate), pentaerythritol tetrakis(2-mercaptoacetate), pentaerythritol tetrakis(3-mercaptopropionate), 2,5-bis(mercaptomethyl)-1,4-dithiane, bis((2-mercaptoethyl)thio)-3-mercaptopropane, 4,7-bis (mercaptomethyl)-3,6,9-trithiaundecane-1,11-dithiol, 4,8-bis(mercaptomethyl)-3,6,9-trithiaundecane-1,11-dithiol and 5,7-bis(mercaptomethyl)-3,6,9-trithiaundecane-1,11-dithiol, and an aromatic polythiol, such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis (mercaptoethyl)benzene, 1,2,3-trimercaptobenzene, 1,2,4-trimercaptobenzene, 1,3,5-trimercaptobenzene, 1,2,3-tris (mercaptomethyl)benzene, 1,2,4-tris(mercaptomethyl) benzene, 1,3,5-tris(mercaptomethyl)benzene, 1,2,3-tris (mercaptoethyl)benzene, 1,2,4-tris(mercaptoethyl)benzene, 1,3,5-tris(mercaptoethyl)benzene, 2,2'-dimercaptobiphenyl, 4,4'-dimercaptobiphenyl, 4,4'-dimercaptodibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(p-methoxyphenyl) propane-2,2-dithiol, 1,3-diphenylpropane-2,2-dithiol, phenylmethane-1,1-dithiol and 2,4-di(p-mercaptophenyl) pentane.

Among the above compounds, bis(2-mercaptoethyl) ether, bis(2-mercaptoethyl) sulfide, 2,5-bis(mercaptomethyl)-1,4-dithiane, trimethylolpropane bis(2-mercaptoacetate), trimethylolpropane bis(3-mercaptopropionate), pentaerythritol tetrakis(2-mercaptoacetate), pentaerythritol tetrakis(3-mercaptopropionate), bis((2-mercaptoethyl)thio)-3-mercaptopropane, 4,7-bis(mercaptomethyl)-3,6,9-trithiaundecane-1, 11-dithiol, 4,8-bis(mercaptomethyl)-3,6,9-trithiaundecane-1,11-dithiol and 5,7-bis(mercaptomethyl)-3,6,9-trithiaundecane-1,11-ditiol are preferred.

The polythiol compound may be used solely or as a combination of two or more kinds thereof.

The mixing ratio of (A) the polyisocyanate compound containing a polyisocyanate compound having an aromatic ring and (B) the polythiol compound is preferably in a range of from 0.5 to 2.0, and more preferably in a range of from 0.95 to 1.05, in terms of the molar ratio of the NCO group in the component (A) and the SH group in the component (B) (NCO group/SH group). The molar ratio (NCO group/SH group) is preferably closer to 1.0 since the residual ratios of the NCO group and the SH group in the polymerization reaction of the component (A) and the component (B) may be smaller, and a plastic lens containing a smaller amount of unreacted groups may be provided.

(C) Benzophenone Compound

The composition used in the plastic lens of the present invention contains as an essential component (C) a benzophenone compound having a hydroxyl group on at least the ortho position from the standpoint of the enhancement of the weather resistance of the resulting plastic lens.

The component (C) may be a compound that has a benzophenone skeleton and has one or more hydroxyl group at the ortho position thereof, and the compound may further have a substituent other than the hydroxyl group.

Examples of the component (C) include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxybenzophenone-5-sulfonic acid, 2-hydroxy-4-methoxybenzophenone-5-sulfonic acid hydrate, 2,2'-dihydroxy-4-methoxybenzophenone, 2,2',4,4'-tetrahydroxybenzophenone, 2,2'-dihydroxy-4,4'-dimethoxybenzophenone, sodium 2,2'-dihydroxy-4,4'-dimethoxybenzophenone-5-sulfonate, bis(5-benzoyl-4-hydroxy-2-methoxyphenyl)methane, 2-hydroxy-4-n-dodecyloxybenzophenone, 2-hydroxy-4-methoxy-2'-carboxybenzophenone, 2,2',4'-trihydroxy-4-ethylbenzophenone, 2,2',4'-trihydroxy-4-propylbenzophenone, 2,2',4'-trihydroxy-4-isopropylbenzophenone, 2,2',4'-trihydroxy-4-butylbenzophenone, 2,2',4'-trihydroxy-4-sec-butylbenzophenone, 2,2',4'-trihydroxy-4-tert-butylbenzophenone, 2,2',4'-trihydroxy-4-pentylbenzophenone, 2,2',4'-trihydroxy-4-hexylbenzophenone, 2,2',4'-trihydroxy-4-heptylbenzophenone, 2,2',4'-trihydroxy-4-octylbenzophenone, 2,2',4'-trihydroxy-4-tert-octylbenzophenone, 2,2',4'-trihydroxy-4-nonylbenzophenone, 2,2',4'-trihydroxy-4-decylbenzophenone, 2,2',4'-trihydroxy-4- undecylbenzophenone, dodecylbenzophenone, 2,2',4'-trihydroxy-4-ethoxybenzophenone, 2,2',4'-trihydroxy-4-propyloxybenzophenone, 2,2',4'-trihydroxy-4-isopropyloxybenzophenone, 2,2',4'-trihydroxy-4-butoxybenzophenone, 2,2',4'-trihydroxy-4-sec-butyloxybenzophenone, 2,2',4'-trihydroxy-4-tert-butyloxybenzophenone, 2,2',4'-trihydroxy-4-pentyloxybenzophenone, 2,2',4'-trihydroxy-4-hexyloxybenzophenone, 2,2',4'-trihydroxy-4-heptyloxybenzophenone, 2,2',4'-trihydroxy-4-octyloxybenzophenone, 2,2',4'-trihydroxy-4-tert-octyloxybenzophenone, 2,2',4'-trihydroxy-4-nonyloxybenzophenone, 2,2',4'-trihydroxy-4-decyloxybenzophenone, 2,2',4'-trihydroxy-4-undecyloxybenzophenone and 2,2',4'-trihydroxy-4-dodecyloxybenzophenone. These compounds may be used solely or as a mixture of two or more kinds thereof.

Among the above compounds, 2-hydroxy-4-octoxybenzophenone is preferably used from the standpoint of the solubility in the components (A) and (B) in the composition and the appearance of the resulting plastic lens.

the content of the component (C) is from 0.5 to 5.0 part by mass, and preferably from 1.0 to 3.0 parts by mass, per 100 parts by mass in total of the components (A) and (B) contained in the composition. When the content of the component (C) is less than 0.5 part by mass, the resulting plastic lens has insufficient weather resistance, and when the content exceeds 5.0 parts by mass, the resulting plastic lens may have problems in the appearance, the solubility of the component (C) in the composition, and the like.

(D) Phenol Compound

The composition used in the plastic lens of the present invention contains (D) a phenol compound from the standpoint of the enhancement of the weather resistance of the resulting plastic lens. The composition used in the plastic lens of the present invention contains the component (C) and (D) the phenol compound as essential components, and the combination use of these components may impart sufficient weather resistance to the plastic lens.

Examples of the phenol compound used in the present invention include phenol; a substituted phenol compound, such as cresol, ethylphenol, isopropylphenol, tert-butylphenol, hexylphenol, cyclohexylphenol, 2-methoxyphenol, 4-methoxyphenol, 2,6-dimethyl-p-cresol, 2,6-diethoxy-p-cresol, 2,6-di-n-propyl-p-cresol, 2,6-diisopropyl-p-cresol, 2,6-di-n-butyl-p-cresol, 2,6-diisobutyl-p-cresol, 4-allyl-2-methoxyphenol and 2,4-bis((octylthio)methyl)-o-cresol; a hindered phenol compound, such as (3,5-di-tert-butyl-4-hydroxy)phenylmethane (i.e., 2,6-di-tert-butyl-p-cresol), 1,6-hexamethylene-bis(3-(3,5-di-tert-butyl-4-hydroxyphenyl)propionate), 2,4-bis(octylthio)-6-(4-hydroxy-3,5-di-tert-butylamino)-1, 3,5-triazine, pentaerythritol tetrakis(3-(3,5-di-tert-butyl-4-hydroxyphenyl)propionate), triethylene glycol bis(3-(3-tert-butyl-5-methyl-4-hydroxyphenyl)propionate), 2,2-thiodiethylene-bis(3-(3,5-di-tert-butyl-4-hydroxypheny 1)propionate), octadecyl-3-(3,5-di-tert-butyl-4-hydroxyphenyl)propionate, N,N'-hexamethylenebis(3,5-di-tert-butyl-4-hydroxyhydrocinn amamide), 3,5-di-tert-butyl-4-hydroxybenzylphosphonate diethyl ester, 1,3,5-trimethyl-2,4,6-tris(3,5-di-tert-butyl-4-hydroxybenzyl)benzene, tris(3,5-di-tert-butyl-4-hydroxybenzyl) isocyanurate and isooctyl-3-(3,5-di-tert-butyl-4-hydroxyphenyl) propionate; a polyhydric phenol compound, such as catechol, resorcin, hydroquinone, tert-butylcatechol and pyrogallol; a bisphenol compound, such as bisphenol and dimethylbisphenol; a bisphenol compound, such as bisphenol A, bisphenol F, bisphenol S, methylenebis (methyl-tert-butylphenol) and thiobis (methyl-tert-butylphenol); a naphthol compound, such as naphthol and dihydroxynaphthalene; and halogen-substituted compounds thereof.

Among the above compounds, (D) the phenol compound used is preferably a hindered phenol compound containing a structure having a tert-butyl group and an alkyl group at the ortho position of the phenol (i.e., a hindered phenol compound having a (3-tert-butyl-4-hydroxy-5-alkyl)phenyl group) from the standpoint of the appearance of the resulting plastic lens. The alkyl group is preferably a linear or branched alkyl group having from 1 to 8 carbon atoms, and more preferably a methyl group or a tert-butyl group.

Furthermore, (D) the phenol compound used is more preferably (3,5-di-tert-butyl-4-hydroxy)phenylmethane (i.e., 2,6-di-tert-butyl-p-cresol) from the standpoint of the solubility in the components (A) and (B) in the composition and the appearance of the resulting plastic lens.

The phenol compound may be used solely or as a combination of two or more kinds thereof.

The content of (D) the phenol compound is from 0.5 to 5.0 parts by mass, and preferably from 1.0 to 3.0 parts by mass, per 100 parts by mass in total of (A) the polyisocyanate compound having an aromatic ring and (B) the polythiol compound contained in the composition. When the content of the component (D) is less than 0.5 part by mass, the resulting plastic lens has insufficient weather resistance, and when the content exceeds 5.0 parts by mass, there may be a problem of deteriorated appearance of the resulting plastic lens, or a problem in the solubility of (D) the phenol compound in the composition.

The total amount of the component (C) and the component (D) in the composition is from 1.0 to 10.0 parts by mass, and preferably from 1.5 to 5.0 parts by mass, per 100 parts by mass in total of the components (A) and (B) from the standpoint of the appearance, the solubility, and the weather resistance of the resulting plastic lens.

The component (C) and the component (D) may be mixed in arbitrary ratios in consideration of the appearance, the solubility, and the weather resistance of the resulting plastic lens.

Additional Components

The composition containing the components (A) to (D) may contain, depending on necessity, a polymerization catalyst, a mold releasing agent, a crosslinking agent, a light stabilizer, a discoloration preventing agent, a dye, a viscosity modifier, a polymerization modifier, and the like.

The polymerization catalyst is preferably an organic tin compound. Examples thereof include dibutyl tin diacetate, dibutyl tin dilaurate, dibutyl tin dichloride, dimethyl tin dichloride, monomethyl tin trichloride, trimethyl tin chloride, tributyl tin chloride, tributyl tin fluoride and dimethyl tin dibromide, and dimethyl tin dichloride is preferred from the standpoint of the polymerization rate.

The polymerization catalyst may be used solely or as a combination of two or more kinds thereof.

The mixing ratio of the polymerization catalyst is preferably from 0.001 to 1.0 parts by mass, and more preferably from 0.01 to 0.5 part by mass, per 100 parts by mass in total of the components (A) and (B) from the standpoint of the polymerization rate of the components (A) and (B).

The mold releasing agent may be, for example, an acidic phosphate ester compound added internally, and a phosphate ester and a phosphate diester may be used, examples of which include isopropyl acid phosphate, diisopropyl acid phosphate, butyl acid phosphate, dibutyl acid phosphate, butoxy ethyl acid phosphate, dibutoxyethyl acid phosphate, hexyl acid phosphate, dihexyl acid phosphate, octyl acid phosphate, dioctyl acid phosphate, 2-ethylhexyl acid phosphate, di(2-ethylhexyl) acid phosphate, nonyl acid phosphate, dinonyl acid phosphate, decyl acid phosphate, didecyl acid phosphate, dodecyl acid phosphate, didodecyl acid phosphate, tridecyl acid phosphate, di(tridecyl) acid phosphate, tetradecyl acid phosphate, di(tetradecyl) acid phosphate, hexadecyl acid phosphate, dihexadecyl acid phosphate, stearyl acid phosphate, distearyl acid phosphate, phenyl acid phosphate, diphenyl acid phosphate, propylphenyl acid phosphate, di(propylphenyl) acid phosphate, butylphenyl acid phosphate and di(butylphenyl) acid phosphate. Some of the mold releasing agent have a function of a reaction catalyst of polyurethane, and thus the mold releasing agent is necessarily selected in consideration of the reaction rate of the isocyanate compound having an aromatic ring and the polythiol compound, the mold releasing function, and the transparency of the composition.

Among the above compounds, butoxyethyl acid phosphate is preferred from the standpoint of the solubility in the composition.

The mold releasing agent may be used solely or as a combination of two or more kinds thereof.

The mixing ratio of the mold releasing agent is preferably from 0.01 to 1.0 part by mass, and more preferably from 0.02 to 0.5 part by mass, per 100 parts by mass in total of the components (A) and (B) from the standpoint of the mold releasing function, the appearance and the catalytic function.

Plastic Lens

The plastic lens of the present invention is formed by polymerization of the composition containing the components (A) to (D) as the essential components. The mixing order and the mixing method of the components of the composition are not particularly limited as far as the components may be mixed uniformly, and any known method may be applied thereto.

The composition may be polymerized by a known method, and a mold casting polymerization method is preferably used from the standpoint of the production of the plastic lens. In the mold casting polymerization method, for example, the components (A) to (D) and the additional components, which may be added depending on necessity, are mixed to prepare a composition, and the composition is then cast in a mold containing a combination of a glass or metal mold and a resin gasket, and polymerized under heating. The polymerization conditions may vary depending on the kinds of the components (A) and (B) used, and may be, for example, a polymerization temperature of from 0 to 150° C. and a polymerization time of from 0.5 to 72 hours.

The plastic lens thus obtained has excellent weather resistance and is useful, for example, as a spectacle lens, a camera lens, a projector lens, a telescope lens, a magnifier lens, and the like.

The weather resistance of the plastic lens may be evaluated by the method described in the examples.

EXAMPLE

The present invention will be described in more detail with reference to examples below, but the present invention is not limited to the examples. The properties of the plastic lens were evaluated by the following manners.

Examples 1 to 5 and Comparative Examples 1 to 5

(1) Evaluation of Appearance of Composition before Polymerization (Transparency)

The compositions shown in Examples and Comparative Examples were prepared and evaluated for the appearance of the monomers before polymerization in such a manner that 50 mL of the composition was placed in a color comparison tube (for 50 mL specimen), and the transparency thereof was evaluated in a dark room under fluorescent light. One that was transparent due to dissolution of the components in the composition was evaluated as "A", and one that has fog or turbidity in the composition or contained an insoluble matter, such as the component (C) and/or (D), was evaluated as "B".

(2) Appearance of Plastic Lens (Transparency)

The plastic lenses produced by the methods shown in Examples and Comparative Examples were visually observed. One having no fog observed was evaluated as "A", and one having fog observed was evaluated as "B".

(3) Evaluation of Weather Resistance of Plastic Lens

The D-000 plastic lenses (ct: 2.0 mm) produced by the methods shown in Examples and Comparative Examples were measured for the X, Y and Z values with DOT-3C, produced by Murakami Color Research Laboratory Co., Ltd., and the YI value was calculated by the following expression (1) and designated as the initial YI value.

$$YI=((1.28X-1.06Z)/Y)\times100 \qquad (1)$$

The plastic lenses were irradiated by a tester QUV, produced by Q-Lab Corporation, for 72 hours, and then measured for the X, Y and Z values with DOT-3C, produced by Murakami Color Research Laboratory Co., Ltd., and the YI value after irradiation was calculated by the expression (1). The ΔYI value was obtained by subtracting the initial YI value from the YI value after irradiation, and one having a smaller ΔYI value was evaluated as one having better weather resistance.

Example 1

39.88 g of (A1) 4,4'-methylenebisphenyl diisocyanate as (A) the polyisocyanate compound having an aromatic ring, 11.49 g of (A2) 1,6-hexamethylene diisocyanate (HDI) as the polyisocyanate compound having no aromatic ring were charged in a 300-mL recovery flask, to which 1.50 g of (C1) 2-hydroxy-4-octoxybenzophenone as (C) the benzophenone compound, 1.50 g of (D1) 2,6-di-tert-butyl-p-cresol as (D) the cresol compound, 0.10 g of butoxyethyl acid phosphate (JP-506H, a trade name, produced by Johoku Chemical Co., Ltd.) as the mold releasing agent, and 0.10 g of dimethyl tin dichloride as the polymerization catalyst were added, and the mixture was stirred at 50° C. under purging with nitrogen for 10 minutes. After the components were completely dissolved, 31.40 g of (B1) 2,5-dimercaptomethyl-1,4-dithiane (DMMD) and 17.23 g of (B2) pentaerythritol tetrakis (2-mercaptoacetate) (PETMA) as (B) the polythiol compound were mixed therein, and the mixture was stirred under reduced pressure of 0.13 kPa (1.0 Torr) for 20 minutes to prepare a composition 1.

The composition 1 was cast in a lens mold having a center thickness of 2 mm through a 1.0-μm polytetrafluoroethylene membrane filter and subjected to mold casting polymerization with a temperature program with the initial temperature of 30° C. to the final temperature of 120° C. over 24 hours, thereby producing a plastic lens. The evaluation results thereof are shown in Table 1.

Example 2

A plastic lens was produced in the same manner as in Example 1 except that the amount of (C1) 2-hydroxy-4-octoxybenzophenone added was changed to 2.50 g. The evaluation results thereof are shown in Table 1.

Example 3

A plastic lens was produced in the same manner as in Example 1 except that the amount of (C1) 2-hydroxy-4-octoxybenzophenone added was changed to 0.50 g. The evaluation results thereof are shown in Table 1.

Example 4

A plastic lens was produced in the same manner as in Example 1 except that the amount of (D1) 2,6-di-tert-butyl-p-cresol added was changed to 2.50 g. The evaluation results thereof are shown in Table 1.

Example 5

A plastic lens was produced in the same manner as in Example 1 except that the amount of (D1) 2,6-di-tert-butyl-p-cresol added was changed to 0.50 g. The evaluation results thereof are shown in Table 1.

Comparative Example 1

A plastic lens was produced in the same manner as in Example 1 except that (C1) 2-hydroxy-4-octoxybenzophenone and (D1) 2,6-di-tert-butyl-p-cresol were not added. The evaluation results thereof are shown in Table 1.

Comparative Example 2

A plastic lens was produced in the same manner as in Example 5 except that (C1) 2-hydroxy-4-octoxybenzophenone was not added. The evaluation results thereof are shown in Table 1.

Comparative Example 3

A plastic lens was produced in the same manner as in Example 1 except that (D1) 2,6-di-tert-butyl-p-cresol was not added. The evaluation results thereof are shown in Table 1.

Comparative Example 4

A plastic lens was produced in the same manner as in Example 1 except that the amount of (C1) 2-hydroxy-4-octoxybenzophenone added was changed to 0.40 g, and the amount of (D1) 2,6-di-tert-butyl-p-cresol added was changed to 0.40 g. The evaluation results thereof are shown in Table 1.

Comparative Example 5

A plastic lens was produced in the same manner as in Example 1 except that the amount of (C1) 2-hydroxy-4-octoxybenzophenone added was changed to 7.00 g, and the amount of (D1) 2,6-di-tert-butyl-p-cresol added was changed to 7.00 g. The evaluation results thereof are shown in Table 1.

TABLE 1

| | | | Example | | | | | Comparative Example | | | | |
|---|---|---|---|---|---|---|---|---|---|---|---|---|
| | | | 1 | 2 | 3 | 4 | 5 | 1 | 2 | 3 | 4 | 5 |
| Composition (part by mass) | (A) Polyisocyanate compound | (A1) 4,4'-methylenebisphenyl diisocyanate (MDI) | 39.88 | 39.88 | 39.88 | 39.88 | 39.88 | 39.88 | 39.88 | 39.88 | 39.88 | 39.88 |
| | | (A2) 1,6-hexamethylene diisocyanate (HDI) | 11.49 | 11.49 | 11.49 | 11.49 | 11.49 | 11.49 | 11.49 | 11.49 | 11.49 | 11.49 |
| | (B) Polythiol compound | (B1) 2,5-dimercaptomethyl-1,4-dithiane | 31.40 | 31.40 | 31.40 | 31.40 | 31.40 | 31.40 | 31.40 | 31.40 | 31.40 | 31.40 |
| | | (B2) pentaerythritol tetrakis (2-mercapoacetate) | 17.23 | 17.23 | 17.23 | 17.23 | 17.23 | 17.23 | 17.23 | 17.23 | 17.23 | 17.23 |
| | (C) Benzophenone compound | (C1) 2-hydroxy-4-octoxybenzo phenone | 1.50 | 2.50 | 0.50 | 1.50 | 1.50 | — | — | 1.50 | 0.40 | 7.00 |
| | (D) Phenol compound | (D1) 2,6-di-tert-butyl-p-cresol | 1.50 | 1.50 | 1.50 | 2.50 | 0.50 | — | 0.50 | — | 0.40 | 7.00 |
| | Additional components | mold releasing agent (butoxyethyl acid phosphate) | 0.10 | 0.10 | 0.10 | 0.10 | 0.10 | 0.10 | 0.10 | 0.10 | 0.10 | 0.10 |
| | | polymerization catalyst (dimethyl tin dichloride) | 0.10 | 0.10 | 0.10 | 0.10 | 0.10 | 0.10 | 0.10 | 0.10 | 0.10 | 0.10 |
| Evaluation results | Appearance of composition before polymerization (transparency) | | A | A | A | A | A | A | A | A | A | A |
| | Appearance of plastic lens (transparency) | | A | A | A | A | A | A | A | A | A | B |
| | Initial discoloration of plastic lens | X | 83.20 | 83.04 | 84.11 | 83.42 | 83.52 | 87.21 | 87.25 | 82.95 | 84.15 | — |
| | | Y | 88.95 | 89.07 | 89.16 | 89.04 | 89.12 | 89.00 | 89.02 | 88.70 | 89.17 | — |
| | | Z | 89.15 | 87.88 | 93.32 | 90.02 | 90.32 | 104.11 | 104.15 | 88.92 | 93.51 | — |
| | | YI | 13.49 | 14.75 | 9.80 | 12.75 | 12.53 | 1.43 | 1.44 | 13.44 | 9.63 | — |
| | Discoloration of plastic lens after weather resistance test | X | 81.61 | 82.04 | 82.65 | 82.61 | 81.97 | 79.04 | 80.68 | 80.45 | 81.76 | — |
| | | Y | 87.59 | 88.14 | 88.04 | 88.33 | 87.86 | 85.06 | 86.40 | 86.61 | 87.35 | — |
| | | Z | 83.10 | 84.90 | 87.84 | 87.51 | 85.19 | 73.25 | 79.62 | 79.11 | 84.26 | — |
| | | YI | 18.69 | 17.04 | 14.40 | 14.70 | 16.64 | 27.66 | 21.84 | 22.08 | 17.56 | — |
| | Weather resistance of plastic lens | ΔYI | 5.21 | 2.29 | 4.60 | 1.94 | 4.11 | 26.23 | 20.40 | 8.64 | 7.92 | — |

It is understood from Table 1 that the plastic lenses obtained in Examples 1 to 5 have excellent weather resistance as compared to Comparative Examples 1 to 3 where the components (C) and/or (D) are not contained and Comparative Example 4 where the contents of the components (C) and (D) are small. In Comparative Example 5 where the contents of the components (C) and (D) are large, the plastic lens thus produced has fog observed.

Industrial Applicability

According to the present invention, a plastic lens is provided that has excellent weather resistance and is favorably used as a spectacle lens, a camera lens, a projector lens, a telescope lens, a magnifier lens, and the like.

The invention claimed is:

1. A plastic lens formed by polymerization of a composition that comprises:
    100 parts by mass in total of (A) a polyisocyanate compound having an aromatic ring and (B) a polythiol compound,
    from 0.5 to 5.0 parts by mass of (C) a benzophenone compound having a hydroxyl group on at least the ortho position, and
    from 0.5 to 5.0 parts by mass of (D) a phenol compound.

2. The plastic lens of claim 1, wherein the polyisocyanate compound is at least one compound selected from the group consisting of 4,4'-methylenebisphenyl diisocyanate, 2,4'-methylenebisphenyl diisocyanate and methyl-1,3-phenylene diisocyanate.

3. The plastic lens of claim 1, wherein (D) the phenol compound is a hindered phenol compound comprising a structure having a tert-butyl group and an alkyl group at the ortho position of the phenol.

4. The plastic lens of claim 3, wherein the hindered phenol compound is 2,6-di-tert-butyl-p-cresol.

5. The plastic lens of claim 2, wherein (D) the phenol compound is a hindered phenol compound comprising a structure having a tert-butyl group and an alkyl group at the ortho position of the phenol.

6. The plastic lens of claim 1, wherein the polyisocyanate compound is 4,4'-methylenebisphenyl diisocyanate.

7. The plastic lens of claim 1, wherein the polyisocyanate compound is 2,4'-methylenebisphenyl diisocyanate.

8. The plastic lens of claim 1, wherein the polyisocyanate compound is methyl-1,3-phenylene diisocyanate.

* * * * *

UNITED STATES PATENT AND TRADEMARK OFFICE
CERTIFICATE OF CORRECTION

Page 1 of 1

PATENT NO. : 8,895,661 B2
APPLICATION NO. : 14/238964
DATED : November 25, 2014
INVENTOR(S) : Shinsuke Itoh et al.

It is certified that error appears in the above-identified patent and that said Letters Patent is hereby corrected as shown below:

On the title page, Item (86), the PCT Information is incorrect. Item (86) should read:

--(86) PCT No.:     PCT/JP2012/070734

§ 371 (c)(1),
    (2), (4) Date:    Feb. 6, 2014--

Signed and Sealed this
Twenty-eighth Day of April, 2015

Michelle K. Lee
*Director of the United States Patent and Trademark Office*

UNITED STATES PATENT AND TRADEMARK OFFICE
CERTIFICATE OF CORRECTION

PATENT NO. : 8,895,661 B2  
APPLICATION NO. : 14/238964  
DATED : November 25, 2014  
INVENTOR(S) : Shinsuke Itoh et al.

Page 1 of 1

It is certified that error appears in the above-identified patent and that said Letters Patent is hereby corrected as shown below:

On the title page, Item (86), the PCT Information is incorrect. Item (86) should read:

--(86) PCT No.:  PCT/JP2012/070734

§ 371 (c)(1),  
(2), (4) Date:  Jun. 2, 2014--

Signed and Sealed this  
Sixth Day of October, 2015

Michelle K. Lee  
*Director of the United States Patent and Trademark Office*